(12) United States Patent
Lumpe et al.

(10) Patent No.: US 6,616,221 B2
(45) Date of Patent: Sep. 9, 2003

(54) VEHICLE ROOF

(75) Inventors: Karl-Heinz Lumpe, Sprockhovel (DE); Michael Gross, Bocuml (DE); Klaus Kolodzeij, Wuppertal (DE)

(73) Assignee: JAC Products Deutschland GmbH, Wuppertal (DE)

( * ) Notice: Subject to any disclaimer, the term of this patent is extended or adjusted under 35 U.S.C. 154(b) by 0 days.

(21) Appl. No.: 10/067,133

(22) Filed: Feb. 4, 2002

(65) Prior Publication Data

US 2002/0140254 A1 Oct. 3, 2002

(30) Foreign Application Priority Data

Feb. 6, 2001 (DE) .......................... 101 05 165

(51) Int. Cl.[7] .............................................. B62D 25/07
(52) U.S. Cl. ...................... 296/210; 224/309; 296/37.7
(58) Field of Search ............................. 296/29, 203.01, 296/210, 196, 197, 37.7; 224/309

(56) References Cited

U.S. PATENT DOCUMENTS

| | | | | |
|---|---|---|---|---|
| 4,364,498 A | * | 12/1982 | Kuus et al. .................. | 224/309 |
| 4,834,448 A | * | 5/1989 | Sakamoto et al. .......... | 296/210 |
| 4,883,310 A | * | 11/1989 | Miyazaki et al. ........... | 296/210 |
| 4,957,326 A | | 9/1990 | Chiba et al. ................ | 296/210 |
| 5,018,781 A | * | 5/1991 | Kumasaka et al. ......... | 296/210 |
| 5,090,605 A | * | 2/1992 | Cucheran .................... | 224/309 |
| 5,190,198 A | * | 3/1993 | Cucheran .................... | 224/309 |
| 5,636,776 A | * | 6/1997 | Rak et al. .................... | 224/309 |
| 5,713,498 A | * | 2/1998 | Cucci .......................... | 224/309 |
| 5,782,392 A | * | 7/1998 | Yamamoto .................. | 224/309 |
| 5,954,251 A | * | 9/1999 | Tress et al. ................. | 224/309 |
| 5,975,391 A | * | 11/1999 | Aftanas et al. ............. | 224/309 |
| 5,979,723 A | * | 11/1999 | Tress et al. ................. | 224/309 |
| 6,112,964 A | * | 9/2000 | Cucheran et al. ........... | 224/309 |
| 6,158,637 A | * | 12/2000 | Fisch et al. ................. | 224/309 |
| 6,419,134 B1 | * | 7/2002 | Grimm et al. .............. | 224/309 |

FOREIGN PATENT DOCUMENTS

| | | |
|---|---|---|
| DE | 19853820 A1 | 5/2000 |
| EP | 0960804 | 1/1999 |
| FR | 0325876 | 8/1989 |
| JP | 10 086758 | 4/1998 |
| JP | 10 250490 | 9/1998 |
| JP | 11 348672 | 12/1999 |

OTHER PUBLICATIONS

WO91/19627.

* cited by examiner

*Primary Examiner*—D. Glenn Dayoan
*Assistant Examiner*—Lori L Coletta
(74) *Attorney, Agent, or Firm*—Harness Dickey & Pierce P.L.C.

(57) ABSTRACT

A vehicle roof assembly includes a roof panel having longitudinal edges, each of which define a rim, structural bars disposed within and running along at least a portion of the rims, and frame rails running along at least a portion of each of the longitudinal edges. The rims abut the frame rails, and the structural bars are fixedly attached to the frame rails. Preferably, the rims are glued to the frame rails. The structural bars each include a web portion disposed between a contact surface abutting the roof panel, and a contact surface abutting the frame rails. Top-carriers including top-carrier cross braces are selectively attachable to the roof panel, and the structural bar. A roof liner is attached to a bottom surface of the roof panel, and an intermediate layer of plastic foam is disposed between the roof liner and the roof panel.

22 Claims, 2 Drawing Sheets

VEHICLE ROOF

FIELD OF THE INVENTION

This invention relates to the roof of an automobile such as a sedan, a limousine, a coupe, a station wagon, a van or a minibus with a top panel whose longitudinal edges can be attached to corresponding longitudinal beams of the roof frame of the auto body.

BACKGROUND OF THE INVENTION

When building an auto body the top panel of the vehicle roof is traditionally welded to the roof frame. In recent times, cemented joints have increasingly taken the place of welded joints. There are certain problems associated with that approach, for instance when during the curing of the cement the joint is exposed to vibrations, which is inevitable during the movement of the auto body on the assembly belt, unless extended curing times and corresponding delay times are to be tolerated.

SUMMARY OF THE INVENTION

It is the objective of this invention to simplify the attachment of a vehicle roof to the longitudinal beams of a roof frame while at the same time reinforcing the top panel and making certain that, after the top panel is cemented to the longitudinal beams of the roof frame, a solid bond with the roof frame is established even while the cement employed is still in the curing process.

According to the invention this objective is achieved by providing the top panel along each longitudinal edge with an permanently attached structural bar which serves both as additional reinforcement of the panel and as a flange for mounting the latter on the longitudinal beams of the roof frame. The structural bars are hollow and are provided on their sides butting against the top panel with at least one opening which permits access to openings in the top panel for accommodating fastening elements for roof rails, top-carrier cross brackets etc. that can be anchored in the structural bars.

The invention thus consists essentially in providing for a vehicle roof a top panel with integrated structural bars which can themselves be attached to the longitudinal beams as a fastening device in addition to the cemented joint between the top panel and the longitudinal beams of the roof frame. The particular advantage of this feature lies in the fact that it ensures a solid connection of the cemented top panel with the longitudinal beams or even with the overall roof frame of the auto body via the structural bars, preventing the cemented joint between the top panel and the roof frame from being affected by any vibration of the auto body as it moves along the assembly belt while the cement is still in the curing stage. Another advantage of the invention consists in the fact that the weight of a load on the roof is not transferred onto the top panel but, via the structural bars, to the substantially stronger roof frame of the auto body.

According to the invention the structural bars are cemented to the top panel while they can be fastened to the longitudinal beams of the roof frame by means of bolts.

When no roof rails, roof-rack cross members etc. are to be mounted, the openings in the top panel can be sealed by means of plugs, slides, lids or the like so as to keep any dirt or moisture from entering the auto body.

The structural bars may be in the form of a rolled or extruded steel or aluminum profile, the openings may be a series of slots, they may also be provided with a strip having perforations with threaded inserts or welded or press-fit insert nuts accepting threaded bolts.

The desire of car makers to increasingly use modular vehicle components is met by a design version of the invention in which the top panel, together with the structural bars cemented to the top panel and with the car ceiling attached to it, constitutes a prefabricated assembly. The car ceiling may include a roof lining and/or interior soft trim, sun visors, interior rear-view mirror, interior lighting, wiring, operating and instrument-panel elements, sliding or sun roof and its mounts and actuating elements, handles, etc.

BRIEF DESCRIPTION OF THE DRAWINGS

The present invention will become more fully understood from the detailed description and the accompany drawings, wherein.

DETAILED DESCRIPTION OF THE PREFERRED EMBODIMENTS

Figure 1:
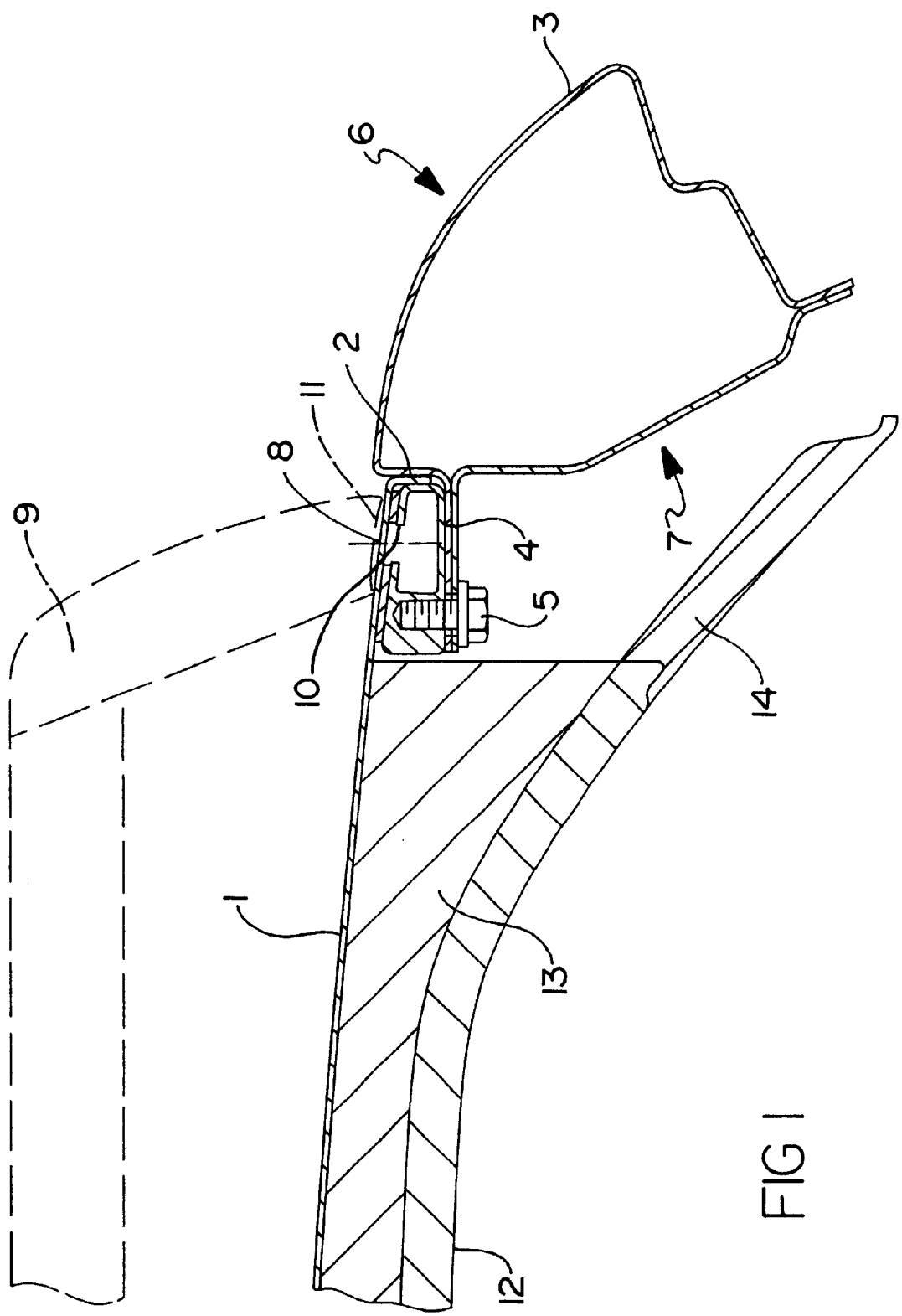
FIG. 1 illustrates a first design example.

FIG. 1 is a section view of a lateral longitudinal-edge region in the roof of a vehicle, showing the top panel 1 of the vehicle roof. The opposite longitudinal edge, not shown, is identical to that illustrated except in mirror-image fashion. Along its longitudinal edges the top panel 1 is bent at an angle and each longitudinal rim 2 rests against a longitudinal beam 3 of a roof frame, not illustrated. The longitudinal rims 2 of the top panel 1 are preferably cemented to the longitudinal beams 3 of which only one is shown.

A structural bar 4 is permanently attached to each longitudinal rim of the top panel 1, for additional support and for mounting the panel on the longitudinal beams 3. The structural bar 4 is preferably cemented to the top panel 1. Each structural bar 4 can be mounted on one of the longitudinal beams 3, preferably by means of fastening screws as illustrated. To that end the structural bars 4 and the longitudinal beams 3 are provided with matching openings through which threaded bolts 5 can be inserted. The structural bars 4 or the longitudinal beams 3 may be provided with threaded inserts, welded or press-fit nuts.

The longitudinal beams 3 may consist of an outer sidewall frame section 6 and a reinforcing inner sidewall frame section 7.

Along its longitudinal rim the top panel 1 is provided with openings 8 which also extend through the side of the structural bar 4 that bounds on the top panel 1, permitting the insertion of mounting bolts, not shown, for roof rails, top carriers 9 etc. indicated by the dashed outline. The openings in the structural bars 4 are in the form of continuous slots 10. As will be evident from the drawing, the weight of a load on the roof is supported by the longitudinal beams 3 via the structural bars 4, leaving the top panel 1 essentially load-free. If no roof rack or rail or top-carrier cross braces 17 are to be mounted, the openings 8 can be easily sealed for instance with a plug 11, indicated by a dotted outline.

In the example shown the vehicle roof includes a special feature in that the top panel 1, together with the structural bars 4 cemented to it and a car ceiling 12 attached to the top panel 1, constitutes a prefabricated assembly which, as the roof module, is to be mounted on the auto body as depicted. The roof module consists of the top panel 1, the structural bars 4, the car ceiling 12 and an intermediate layer 13 between the top panel 1 and the car ceiling 12. The roof module thus features a sandwiched structure in which the intermediate layer 13 consists for instance of a plastic foam material. Between the top panel 1 and the intermediate layer 13 and again between the intermediate layer 13 and the ceiling 12 adhesive layers of physically or chemically cured cement may be provided. The ceiling 12 may connect to a roof-frame molding or side-post trim 14.

While not illustrated that way, the roof module may be equipped with one or several pre-installed features and accessories such as a ceiling liner, interior trims and moldings, sun visors, interior lighting, handles etc.

Figure 2:
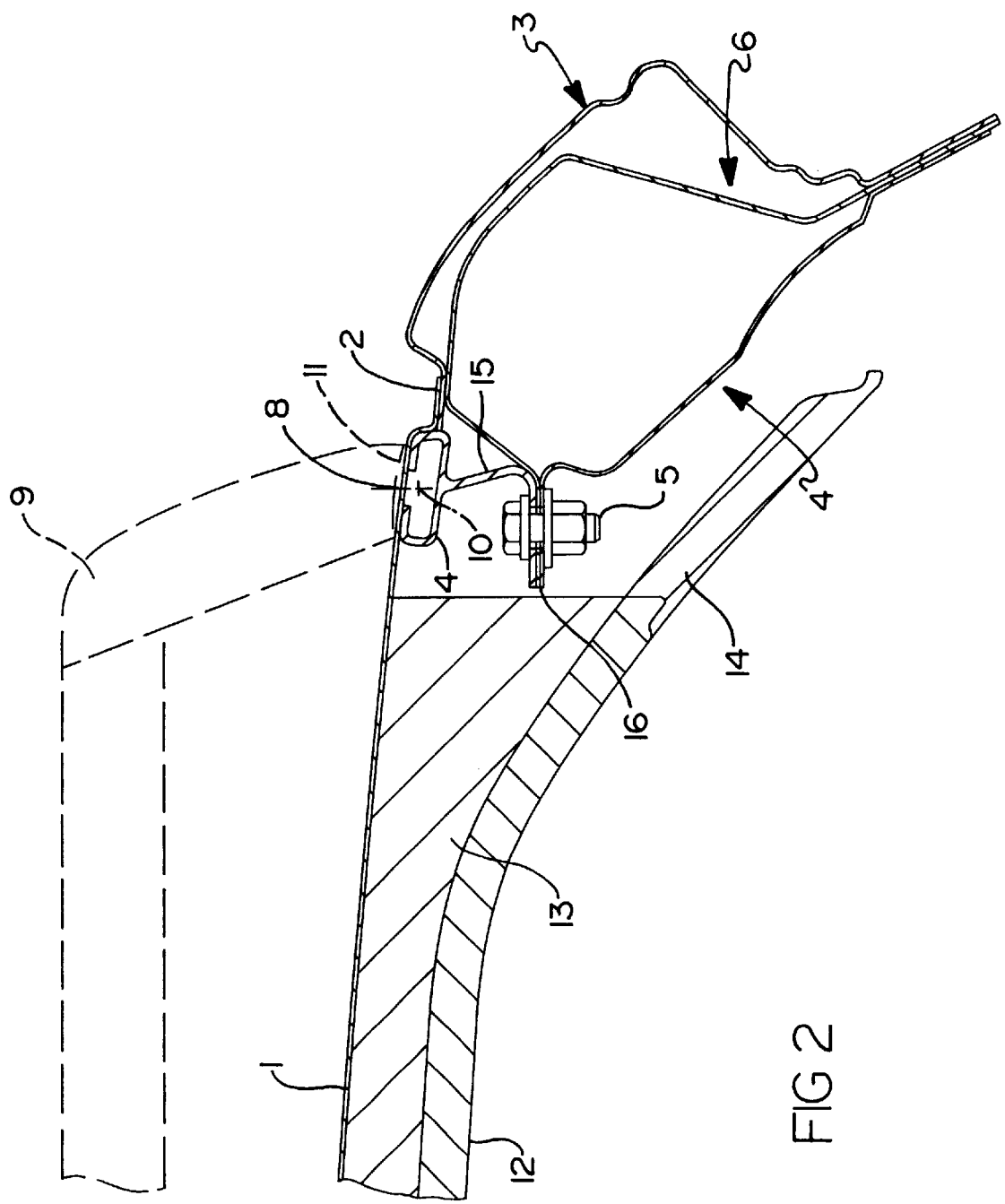
FIG. 2 shows a second design example of a vehicle roof according to this invention.

The design version of this invention per FIG. 2 is essentially identical to that in FIG. 1, therefore using the same reference numbers. The structural bar 4 in FIG. 2 features a web-type extension 15 with a bent ledge 16 that is supported by a flange of the longitudinal beam 3 and is attached to the latter by means of threaded bolts 5 and matching nuts.

The invention described above ensures the positional retention of a roof module while it is cemented to the roof frame of an auto body. Moreover, the added connecting points between the components (screw connections) make for improved structural strength. The invention also serves in advantageous fashion to establish a connection between a cross brace or a roof rack or rail and the body of the vehicle through appropriate mounting provisions.

What is claimed:

1. A vehicle roof for an automobile, comprising:
   a metal top panel having longitudinal edges attached to corresponding longitudinal beams of a roof frame of an auto body;
   permanently attached structural bars running along each longitudinal edge of the metal top panel and which are respectively mounted on the longitudinal beams, the structural bars being hollow; and
   at least one opening formed through each structural bar on a side butting against the top panel, the openings being accessible through the top panel for the mounting of roof rails that can be anchored to the structural bars.

2. The vehicle roof as in claim 1, wherein the structural bars are attached to the top panel by cementing while mounted on the longitudinal beams by screws.

3. The vehicle roof as in claim 1, wherein the openings in the top panel are selectively sealed by one of a group comprising: plugs, slides, and lids.

4. The vehicle roof as in claim 1, wherein the structural bars consist of rolled or extruded steel or aluminum.

5. The vehicle roof as in claim 1, wherein the structural bars are provided with a web having openings.

6. The vehicle roof as in claim 1, wherein the top panel and the structural bars together with a ceiling attached to the top panel constitute a prefabricated assembly.

7. The vehicle roof as in claim 6, wherein the ceiling is provided with a lining.

8. The vehicle roof as in claim 1, wherein the openings are in the form of continuous slots.

9. The vehicle roof as in claim 5, wherein the openings are equipped with one of threaded inserts and welded or press-fit nuts accepting matching threaded bolts.

10. A vehicle roof assembly, comprising:
    a roof panel having longitudinal edges, each of which define a rim;
    structural bars disposed within and running along at least a portion of said rims; and
    vehicle structural beams running along at least a portion of each of said longitudinal edges, said rims abutting said beams and said structural bars being fixedly attached to said beams;
    top-carriers including top-carrier cross braces selectively attachable to said roof panel and said structural bar; and
    said top-carriers are bolted to said roof panel and said structural bars by bolts running through openings of each of said roof panel and said structural bars.

11. The vehicle roof assembly of claim 10, wherein said openings of said structural bars are continuous slots.

12. The vehicle roof assembly of claim 10, wherein said rims are glued to said beams.

13. The vehicle roof assembly of claim 10, wherein said structural bars are bolted to said beams.

14. The vehicle roof assembly of claim 10, further comprising a roof liner attached to a bottom surface of said roof panel.

15. The vehicle roof assembly of claim 14, further comprising an intermediate layer of plastic foam disposed between said roof liner and said roof panel.

16. The vehicle roof assembly of claim 10, wherein said structural bars each include a web portion disposed between a contact surface abutting said roof panel and a contact surface abutting said beams.

17. A prefabricated vehicle roof unit, comprising:
    a vehicle roof assembly including a roof panel having longitudinal edges, each of which define a rim;
    structural bars disposed within and running along at least a portion of said rims;
    openings through each of said roof panel and said structural bars operably accepting fasteners to fasten at least one top carrier to said vehicle roof assembly; and a roof liner attached to a bottom surface of said roof panel, said roof liner spatially separable from said fasteners.

18. The prefabricated vehicle roof unit of claim 17, wherein said structural bars each include a web portion disposed between a contact surface abutting said roof panel and a mounting surface.

19. The prefabricated vehicle roof unit of claim 17, further comprising an intermediate layer of plastic foam disposed between said roof liner and said roof panel.

20. The prefabricated vehicle roof unit of claim 17, wherein said structural bars are glued to said rims.

21. The prefabricated vehicle roof unit of claim 17, further comprising a covering fitted to said roof liner.

22. The prefabricated vehicle roof unit of claim 17, further comprising top-carrier cross braces selectively attachable to said top carriers.

* * * * *